United States Patent [19]

Severinsson

[11] 4,354,582

[45] Oct. 19, 1982

[54] DEVICE AT A SLACK ADJUSTER

[75] Inventor: Lars M. Severinsson, Hishult, Sweden

[73] Assignee: SAB Industri AB, Landskrona, Sweden

[21] Appl. No.: 114,659

[22] Filed: Jan. 23, 1980

[30] Foreign Application Priority Data

Jan. 29, 1979 [SE] Sweden .............................. 7900739

[51] Int. Cl.³ .......................................... F16D 65/042
[52] U.S. Cl. ................................. 188/196 M; 188/197
[58] Field of Search .................... 188/196 F, 199, 202, 188/196 M, 197, 196 R, 196 A, 196 C, 196 P, 196 B, 196 BA, 196 D, 196 V, 197

[56] References Cited

U.S. PATENT DOCUMENTS

| 1,835,008 | 12/1931 | Browall | 188/202 PL |
| 1,887,586 | 11/1932 | Djurson et al. | 188/196 D |
| 3,285,375 | 11/1966 | Jeppsson et al. | 188/202 PL X |
| 3,610,376 | 10/1971 | Baronnet | 188/196 D X |
| 3,768,602 | 10/1973 | Burnett | 188/196 F |
| 3,835,961 | 9/1974 | Troester et al. | 188/196 F X |
| 3,900,084 | 8/1975 | Farr | 188/196 F |

FOREIGN PATENT DOCUMENTS

| 1475503 | 5/1969 | Fed. Rep. of Germany | 188/196 F |
| 331815 | 2/1930 | United Kingdom . | |
| 326178 | 5/1930 | United Kingdom | 188/196 BA |
| 2040373 | 8/1980 | United Kingdom | 188/196 V |

OTHER PUBLICATIONS

WO79/00557 of Aug 23, 1979, to Severinsson Intl. Application (PCT).

Primary Examiner—Joseph F. Peters, Jr.
Assistant Examiner—M. J. Hill
Attorney, Agent, or Firm—Laurence R. Brown

[57] ABSTRACT

A device at a slack adjuster for manually rotating a spindle (1, 5) therein at the replacement of worn-out brake blocks, the spindle being in clutch engagement with a non-rotatable adjuster ear (6).

In order to provide for a rotational movement of the spindle (1, 5) by external circumferential movements back and forth a locking spring (12) is arranged between a part (5) of the spindle and an externally actuatable operating sleeve (10).

5 Claims, 1 Drawing Figure

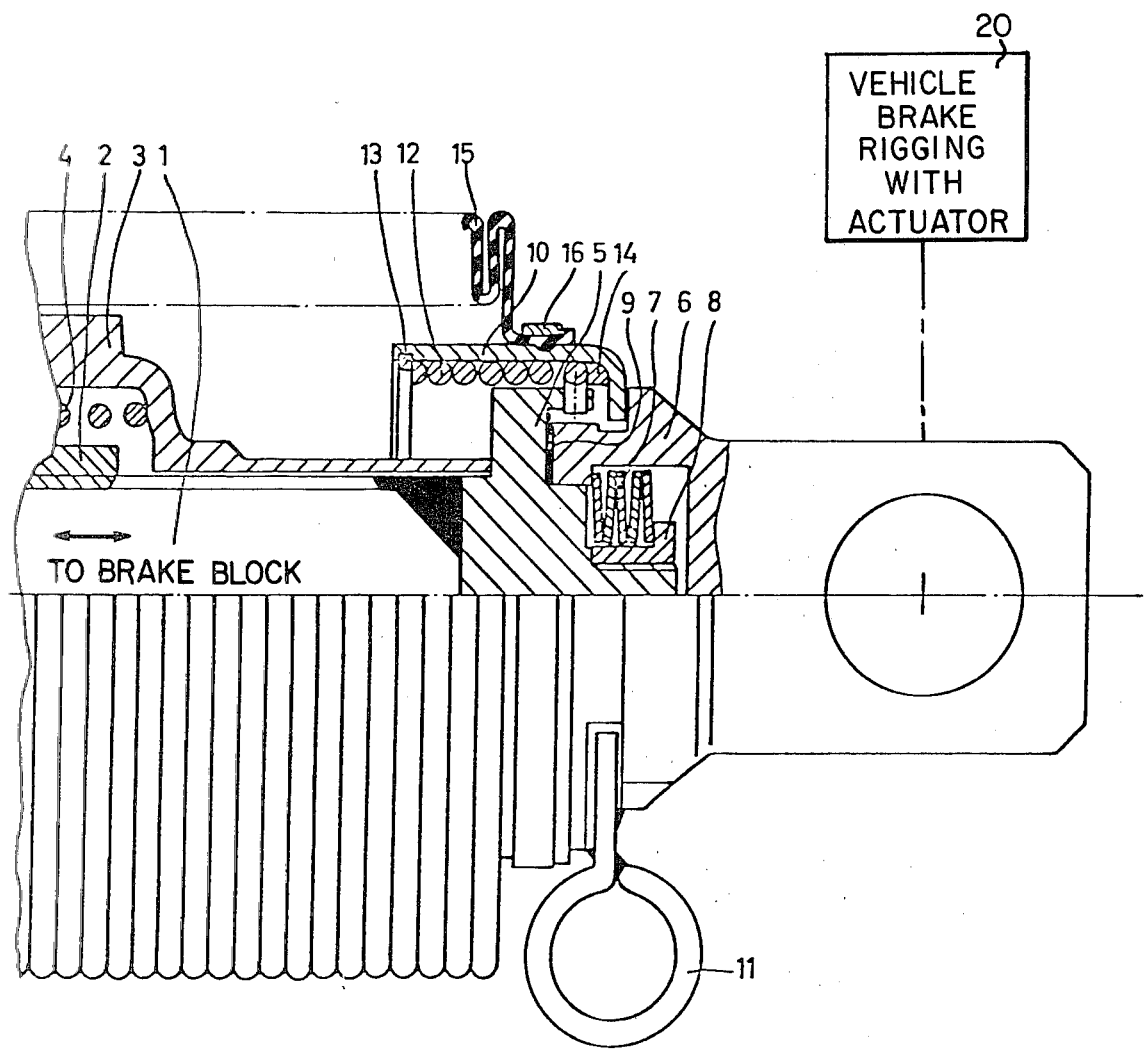

DEVICE AT A SLACK ADJUSTER

TECHNICAL FIELD

This invention relates to a device at a slack adjuster for manually rotating a first part therein, which is coaxial with and held in clutch engagement with a second, non-rotatable part under the action of a spring.

BACKGROUND ART

The normal function of a slack adjuster, especially for a railway vehicle brake rigging, is to prolong itself in relation to the wear of the brake blocks or the like due to relative rotation between different parts therein. For example at the replacement of wornout brake blocks, it is necessary to manually bring back the slack adjuster to its original length by rotating said different parts therein relative to each other in the direction for shortening the adjuster.

This may be accomplished in that two parts, which normally are non-rotatably held together by a clutch arrangement under the action of a spring, are manually rotated relative to each other.

A typical example of this prior art solution is shown in our U.S. Pat. No. 2,793,716, FIG. 4, where an adjuster ear and an adjuster tube normally is held in clutch engagement by means of a spring.

In some cases, however, it is inconvenient or even impossible to rotate the manually rotatable part full turns to accomplish the shortening of the adjuster. It may for example due to limited space available only be possible to rotate the part 20°–30° with an external tool before a new hold must be taken.

DISCLOSURE OF INVENTION

This drawback is according to the invention removed in that a locking spring is arranged between the first part, mentioned in the introduction, and a circumferentially movable operating sleeve, which is externally actuatable.

In this way the manual rotation of the first part may be carried out by small circumferential movements back and forth of the operating sleeve, where only the movements in one direction will be transmitted to the first part by the locking spring. An external tool thus need not be removed from the operating sleeve during the whole operation.

In a practical embodiment, wherein said first part is a spindle with a spindle end piece attached thereto and the second part is an adjuster ear for the usual attachment to a non-rotatable member of the vehicle brake rigging, the locking spring is preferably arranged in the operating sleeve and with an end in engagement with the spindle end piece, the operating sleeve being arranged radially outside the spindle end piece.

In order to provide for as simple handling as possible the operating sleeve may be provided with a tool grip, for example a short tube for an external tool such as an iron bar or the like.

BRIEF DESCRIPTION OF THE DRAWING

The invention will be described in further detail below, reference being made to the accompanying drawing, which in a side view, partly in section, shows an end part of a slack adjuster embodying the invention.

DESCRIPTION OF A PREFERRED EMBODIMENT

Only an end part of a per se conventional slack adjuster is shown in the drawing. This adjuster has a threaded spindle 1 and a nut 2 in non-self-locking engagement therewith. A non-rotatable adjuster tube 3 encloses the whole slack adjusting mechanism, of which the nut 2 is a part. A nut spring 4 is supported by the tube 3 and acts on the nut 2 in a way not shown. The function of the adjuster is not essential to the invention and will therefore not be described in detail. However the spindle 1 is operable to move a brake block in either direction from the actuator in the brake rigging as indicated by the legend and arrow.

A spindle end piece 5 is welded to the spindle 1. An adjuster ear 6 is to be non-rotatably attached to further parts of a vehicle brake rigging 20 and is normally held against the end piece 5 by means of a spring, preferably a compression spring in the form of a stack of cup springs 7, arranged between the adjuster ear 6 and a spring support 8 threaded on to the spindle end piece 5.

A tooth clutch 9 is formed between the spindle end piece 5 and the adjuster ear 6 and has the function normally to keep the two members non-rotatably together under the action of the spring 7 but to allow relative rotation under certain circumstances to be described below.

An operating sleeve 10 is rotatably arranged around the spindle end piece 5. The sleeve 10 is provided with a fixed tool grip 11 in the form of a short tube.

A locking spring 12 is arranged inside the sleeve 10 and is supported by a spring clip 13 therein. At the other end of the locking spring 12 there is a ring 14. The locking spring end remote from the spring clip 13 is inwardly bent and engages the spindle end piece 5.

For preventing the intrusion of moisture, dirt and the like in the adjuster mechanism a rubber bellows 15 is arranged around the adjuster and is as shown attached at its right hand end to the operating sleeve 10 by means for a clamping ring 16.

For example at the replacement of worn-out brake blocks it is desired to manually bring back the adjuster to its shown original position from its extended position (with the adjuster tube 3 at a distance from the spindle end piece 5). In such a case it is only necessary to move the operating sleeve 10 circumferentially back and forth by means of an external tool, such as a bar, handle or the like, inserted in the tool grip 11. At such movement in one direction the locking spring 12, due to its somewhat increasing diameter, will lock the sleeve 10 to the end piece 5, so that the rotational movement will be transmitted to the otherwise nonrotatable spindle 1 thus overcoming the clutch 9 acted on by the spring 7. At the movement in the opposite direction of the operating sleeve 10 the sleeve will only slide on the locking spring 12 due to the somewhat decreasing diameter of the latter.

The locking direction of the locking spring 12 is such as to rotate the spindle 1 in the nut 2 (and possibly other nuts, not shown, in the adjuster) in the direction for diminishing the length of the adjuster.

The rubber bellows 15 will due to its elasticity allow certain circumferential movements back and forth as described, but means (not shown) may if necessary be provided to limit the movements of the operating sleeve 10.

Modifications are possible within the scope of the appended claims. Especially it may be noted that the invention is not limited to the manual rotation of a spindle or the like but is equally applicable to slack adjusters where it is more convenient to manually rotate the adjuster tube or any other member in order to accomplish the desired result. The design of the different parts may also be changed within the scope of the claims. Last but not least it is possible to use the device according to the invention for the normal operation of manual slack adjusters.

I claim:

1. A manual adjustment device for increasing slack in an automatic slack decreasing slack adjuster such as required to install new brake blocks, the adjuster having a rotatable part which turns in one direction to adjust the slack and in an opposite direction in response to said device to increase the slack, comprising in combination, first clutch means in said adjuster holding said rotatable part in frictional engagement with a non-rotatable part for holding the rotatable part non-rotatable in the slack increasing direction and means for manually overcoming said frictional engagement to rotate said rotatable part relative to said holding part in the direction increasing slack including a manually accessible second rotatable member and a one way clutch coupling said second rotatable member to said rotatable part to rotate it when the second rotatable member is rotated in the slack increasing direction with a force overcoming the force of said frictional engagement whereby the second rotatable member may be moved back and forth over a small arc to effect an increase in slack.

2. A device as defined in claim 1 wherein said one way clutch comprises a helical spring which changes in diameter with rotation in said one direction to engage said second rotatable member with said rotatable part.

3. A device as defined in claim 2 wherein said rotatable part is a spindle with a spindle endpiece attached thereto for engaging said helical spring, and said non-rotatable holding part is an adjuster ear for attachment to a non-rotatable member of a vehicle brake rigging.

4. A device as defined in claim 3 wherein said second rotatable member is a sleeve coaxially arranged about said spindle endpiece for engaging said helical spring.

5. A device as defined in claim 1 further comprising a tool grip affixed to said second rotatable member to be accessible exterior of said slack adjuster.

* * * * *